United States Patent
Corkins

(10) Patent No.: US 10,234,021 B2
(45) Date of Patent: Mar. 19, 2019

(54) SHIFT KNOB WITH SELECTABLE SWITCHES

(71) Applicant: Christopher L. Corkins, Abiquiu, NM (US)

(72) Inventor: Christopher L. Corkins, Abiquiu, NM (US)

( * ) Notice: Subject to any disclaimer, the term of this patent is extended or adjusted under 35 U.S.C. 154(b) by 44 days.

(21) Appl. No.: 15/469,876

(22) Filed: Mar. 27, 2017

(65) Prior Publication Data
US 2018/0274664 A1    Sep. 27, 2018

(51) Int. Cl.
| | | |
|---|---|---|
| *H01H 19/11* | (2006.01) | |
| *F16H 59/02* | (2006.01) | |
| *G05G 1/015* | (2008.04) | |
| *G05G 5/03* | (2008.04) | |
| *H01H 25/00* | (2006.01) | |

(52) U.S. Cl.
CPC ......... *F16H 59/0217* (2013.01); *G05G 1/015* (2013.01); *G05G 5/03* (2013.01); *H01H 19/11* (2013.01); *H01H 25/008* (2013.01); *H01H 2231/026* (2013.01)

(58) Field of Classification Search
CPC .. H01H 19/11; H01H 25/06; H01H 2231/026; H01H 25/065; H01H 13/04; H01H 19/04; H01H 2003/0293; H01H 25/008; F16H 59/0217; G05G 5/03; G05G 1/015
USPC .......... 200/61.28, 61.88, 11 J, 11 C, 18, 5 A, 200/561, 6 A, 61.85, 8 R, 43.17, 336, 200/11 R, 316, 51.17, 560, 566
See application file for complete search history.

(56) References Cited

U.S. PATENT DOCUMENTS

| | | |
|---|---|---|
| 1,861,394 A | 5/1932 | Hoover |
| 1,931,775 A | 10/1933 | Stafak |
| 1,998,639 A | 4/1935 | Roberts |
| 2,054,808 A | 9/1936 | Condon |
| 3,293,381 A | 12/1966 | Eitel |
| 3,790,729 A | 2/1974 | Bradshaw |
| 4,360,718 A | 11/1982 | Schobinger et al. |
| 4,574,651 A | 3/1986 | Nordstrom |
| 5,315,900 A | 5/1994 | Teeter |
| 5,481,077 A | 1/1996 | Clegg et al. |
| 5,566,586 A | 10/1996 | Lauer et al. |
| 5,957,001 A | 9/1999 | Gualtieri et al. |
| 6,930,594 B1 | 8/2005 | Wang |
| 2005/0173232 A1* | 8/2005 | Horton ................... H01H 19/11 200/11 R |
| 2013/0270094 A1* | 10/2013 | Hamm ..................... F24C 7/082 200/566 |
| 2015/0027861 A1* | 1/2015 | Hoskins .................. F16H 59/08 200/43.11 |

* cited by examiner

*Primary Examiner* — Ahmed Saeed
(74) *Attorney, Agent, or Firm* — Richard H. Krukar; Kermit D. Lopez; Luis M. Ortiz

(57) ABSTRACT

A knob with internal switches can be installed on a gear shift to provide a driver with handy access to the switches while keeping a hand on the shifter. This can be very handy during four wheeling. A particular switch can be selected by rotating the lower section of the knob to the switch position for that switch. The selected switch can be activated or closed by pulling a spring loaded sliding piece up into the knob. A lockout position prevents the lower section from rotating while detents provide tactile guidance as to when the knob is in a switch position or the lockout position.

19 Claims, 6 Drawing Sheets

SHIFT KNOB WITH SELECTABLE SWITCHES

TECHNICAL FIELD

Embodiments are related to shift knobs, electrical switches, switch selection mechanisms, and switch locking/lock-out mechanisms.

BACKGROUND

Vehicles such as cars, trucks, and vans have a number of switches that a driver can manipulate. Each switch controls something within the vehicle. Some of the switches are more conveniently operated than others. For example, many vehicles have levers such as turn signal levers or headlight control levers that are attached to the vehicle's steering column. Such switches can often be operated while a driver's hands remain on the steering wheel. Other switch can be less convenient such as those on a control panel.

Most vehicles have a shifter of some sort. Vehicles with manual transmissions have shifters that drivers use to select gear ratios. Vehicles with automatic transmissions change the gear ratios automatically and have shifters that select between gearing modes such as in-gear, park, high, low, etc. Electric cars can have shifters that select between forward, reverse, and not energized.

There are driving situations, such as when negotiating rough terrain while off-road, where a driver wants to keep one hand on the shift lever and where steering column mounted levers/switches may be hard to operate as the steering wheel is being actively rotated. Systems and methods for operating switches during intense driving situations are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments that a knob has an upper section, a lower section, a sliding component, and a central shaft. The central shaft can have interior threads such that it, and therefore the entire knob, can be screwed into or onto a vehicle shift lever and thereby become a shift knob on the end of the shifter. A set screw can lock the central shaft to the shift lever or any other threaded rod screwed into the central shaft. The central shaft is fixedly attached to the upper section and, in some embodiments, is permanently attached or even formed as a unit with the upper section.

It is another aspect of the embodiments that the central shaft passes through a hole in the sliding component and the sliding component passes into a hole in the lower section. As such, the sliding component slides up and down the central shaft and in and out of the lower section. The sliding component is spring loaded by a spring inside the lower section that pushes the sliding component out of the lower section. For embodiments having a stop, the stop can prevent the sliding component from being pushed completely out of the lower section. In some embodiments, the stop is electrically conductive and is part of an electrical circuit in the knob. In some embodiments, the sliding component and lower section can be assembled by pushing the sliding component into the lower section, passing the stop through a hole in the top of the lower section, and threading the stop into the sliding component. The top of the stop, being larger than the hole in the lower section, prevents the spring in the lower section from pressing the sliding component completely out of the lower section. Note that the sliding component can slide in and out of the lower section but does not rotate relative to the lower section.

It is yet another aspect of the embodiments that the lower section and sliding component can rotate, as a unit, on, around, or about the central shaft to select one or more switch positions. Each switch position corresponds to a particular rotational alignment. The lower section can have one or more detent engagements that interface with detents in the central shaft or in the upper section to provide a tactile feedback to a person indicating that the lower section has been rotated relative to the upper section into a switch position. The detents and detent engagements also provide a force that tends to keep the lower section and the upper section aligned in a switch position. As such, a person rotating the lower section feels the detented positions as the lower section reaches each of the rotational alignments corresponding to a switch position. Detent mechanisms could instead be between other components that rotate relative to each other such as between lower section and spacer, or between other elements that rotate relative to one another.

"Detent" is an accepted term in the mechanical arts referring to mechanisms, such as those detailed below, for positioning and holding one mechanical part in relation to another such that the relative position of the two parts can be altered by applying force to either part.

It is still another aspect of the embodiments that the knob contains one or more switches with each switch aligned with a switch position. A switch can be closed by rotating the lower section relative to the upper section and pulling the sliding component into the lower section. In some embodiments, the stop can enter the upper section and engage a switch such as a push button switch or other mechanism that closes or opens a circuit. In other embodiments, the top of the stop is one of the switch contacts and the switch closes when the stop enters the upper section and touches against another switch contact. The spring loading on the sliding component can apply a force to open the switch by pushing the sliding section out of the lower section. Note that the sliding component is not pushed completely out, but only as far as mechanically allowed by, for example, the stop.

It is an aspect of some embodiments that the stop is conductive and that a switch is closed when the stop touches an electrical contact within the upper section. Such an embodiment can have an electrical circuit with a first leg that passes from the Upper section to the sliding component. For example, the first leg can include a conductive central shaft in electrical contact with an electrically conductive sliding component. A second leg of the electrical circuit can pass through the sliding component and to a contact, such as a conductive stop, attached to the sliding component. The electrical circuit includes a switch with the stop being one contact and another contact being inside the upper section. The electrical circuit therefore has a switch that can be closed by pulling the sliding component into the lower section to thereby cause one switch contact (the stop) to touch another switch contact.

It is an aspect of certain embodiments that the upper section has a spacer and a knob top fixedly attached together. The central shaft can be fixedly attached to the spacer.

Some embodiments can have a lockout position. For example, rotating the lower section to a lockout alignment can align the stop with a hole or cavity (aka lockout) such that the internal spring, which is pressing the sliding component out of the lower section, presses the top of the stop into the lockout thereby putting the knob in a lockout position. The lower section cannot rotate relative to the upper section when the knob is in the lockout position. The knob can exit the lockout position when the sliding component is pulled into the lower section far enough to cause the stop to exit the lockout. The lockout position can also be a switch position with a lockout switch being closed when the lower section is pulled far enough to close the switch. Disengaging the lockout need not close the lockout switch.

A sensing circuit can detect that a switch has closed or changed state. The sensing circuit can produce a signal indicating that a switch has closed and which switch has closed. The signal can have information indicating which switch closed, which switch changed states, or the current state of all switches. Switch state can simply indicate switch closure or can indicate a more complex mechanism such as toggling. An example of toggling is a physical switch that is spring loaded to an open position with a switch state that toggles, or changes, each time the switch is closed. As such, closing the physical switch once can change the switch state to "closed," closing it again can change the state to "open" and so forth with the switch state toggling between open and closed each time the physical switch is closed. The information can indicate the state of multiple switches when a system has multiple switches. The toggling controller is one example of a switch state controller that changes switch states based on the switch information.

Some embodiments can have the sensing circuit within the lower section while others have the sensing circuit in the upper section. The sensing circuit can be encased within an enclosure. The sensing circuit can be encapsulated in resin or some other electronics encapsulant. The sensing circuit can be normally unpowered and become powered when one of switches closes and provides power, such as battery power, to the sensing circuit.

The sensing circuit can communicate the information to another circuit. The communication can be wired, or wireless. For wireless communication, closing a switch can supply battery power to both the sensing circuit and to a wireless transmitter. The wireless transmitter can send the information to a receiver. The receiver can be attached to, for example, a control board that activates solenoids, valves, motors, relays, or other transducing elements. In this manner, a person driving a vehicle can rotate the lower section to one of the detented positions to select which switch to activate and pull the sliding component to activate the switch. A signal can then be transmitted to a controller that changes the vehicles driving mode to, for example, four wheel drive, two wheel drive, all-wheel drive, super low gearing, axle differential locked, engage drivetrain coupling, or some other mode.

Another receiver, or the same one, can provide information to an indicator that informs a person of the switch state(s). For example, controllers in the back of and under the hood of a vehicle can use the information to change driving modes while a receiver in or near the dashboard can control an indicator providing information to the driver. The indicated information can be simply LEDs indicating switch state, text indicating states or mode, or graphics/imagery indicating states or modes.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof. In general, the figures are not to scale.

A knob with internal switches can be installed on a gear shift to provide a driver with access to the switches while keeping a hand on the shifter. This access can be very convenient during four wheeling. A particular switch can be selected by rotating the lower section of the knob to the switch position for that switch. The selected switch can be activated or closed by pulling a spring loaded sliding piece up into the knob. A lockout position prevents the lower section from rotating while detents provide tactile guidance as to when the knob is in a switch position or the lockout position.

Figure 1:
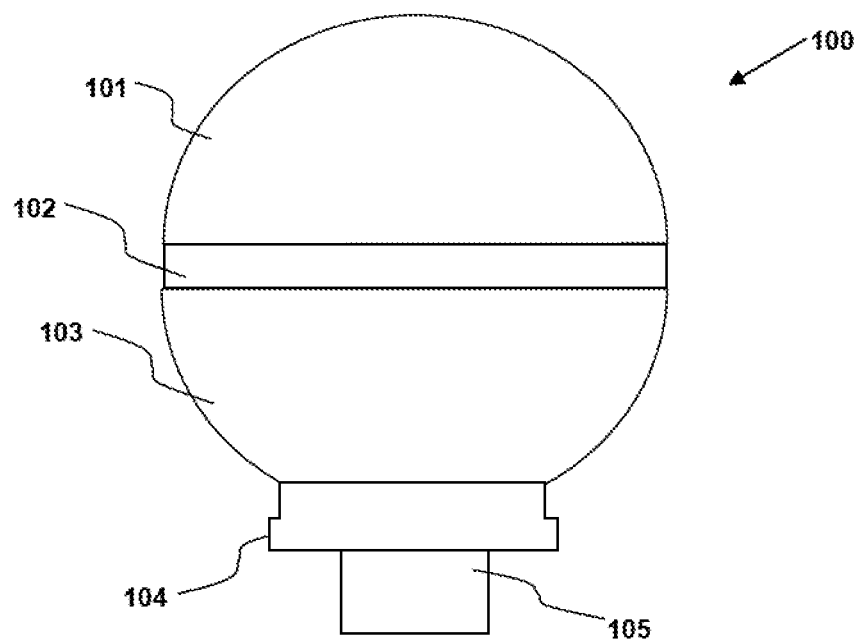
FIG. 1 illustrates a knob with internal switches in accordance with aspects of the embodiments.
Figure 2:
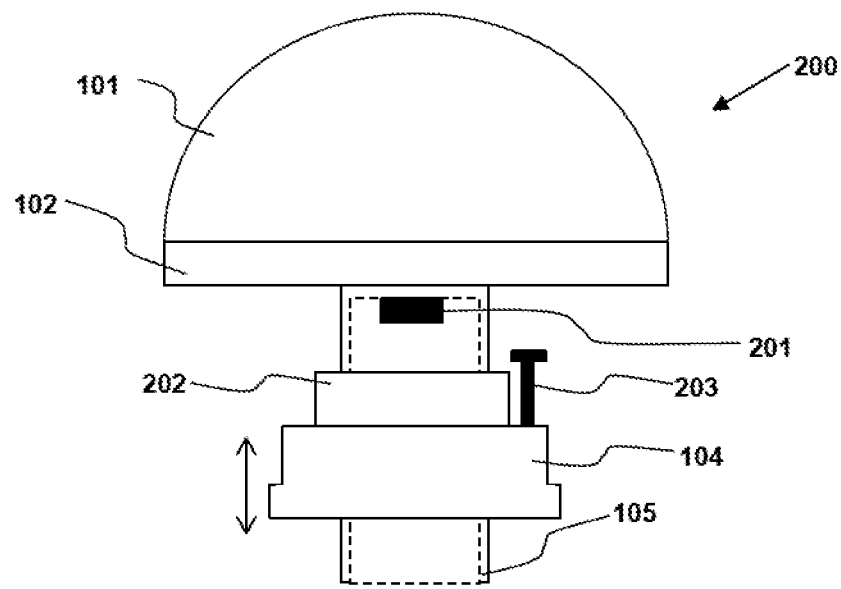
FIG. 2 illustrates the knob of FIG. 1 with the lower section removed in accordance with aspects of the embodiment.

FIG. 1 illustrates a knob 100 with internal switches in accordance with aspects of the embodiments. The knob has a knob top 101, spacer 102, lower section 103, sliding component 104, and central shaft 105. FIG. 2 illustrates the knob 100 of FIG. 1 with the lower section 103 removed. An upper section 200 includes the knob top 101 and spacer 102. The central shaft 105 is a tube closed at one end except for a screw hole and threaded, internally or externally, for attachment to a rod such as a shift lever. In practice, the central shaft is configured for attachment to a rod such as shift lever. One practiced in the mechanical arts knows of many means for attaching a knob to a rod. A screw 201 attaches the closed end of the tube to the spacer 102. The threaded end can be screwed onto a vehicle's shift lever.

The sliding component 104 slides up and down the central shaft 105. A spring 202 pushes the sliding component 104 away from the upper section 200. In a full knob assembly, the spring 202 is within the lower section 103 and presses against an internal portion of the lower section 103 to cause the sliding component 104 to be pushed down and out of the lower section 103. Here, being pushed out of the lower section 103 does not normally mean pushed completely out of the lower section 103 because a stop 203 attached to the sliding component 104 can prevent the spring 202 from pushing the sliding component 104 completely out of the lower section 103. Notice that the top of the stop 203 is larger than the shaft of the stop 203. In certain embodiments, the stop 20 a machine screw that is electrically conductive.

Figure 3:
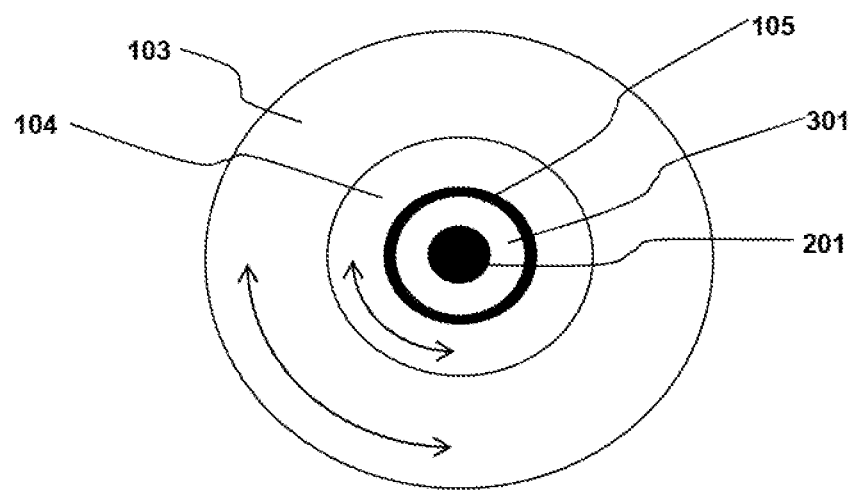
FIG. 3 illustrates a bottom view of the knob 100 of FIG. 1 in accordance with aspects of the embodiments.

FIG. 3 illustrates a bottom view of the knob 100 of FIG. 1 in accordance with aspects of the embodiments. The lower section 103 and sliding component 104 rotate together on central shaft 105. A stop, such as stop 203, can have a shaft that passes through a hole in the lower section and can be fixed to the sliding component 104. In such an embodiment, the shaft of the stop 203 causes the sliding component 104 and lower section 103 to rotate together. The screw 201 attaching the central shaft 105 to the upper section 200 can be seen inside the central shaft 105.

Figure 4:
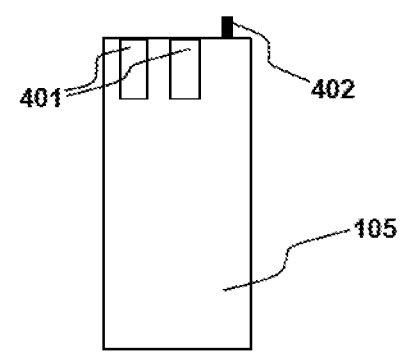
FIG. 4 illustrates a side view of a central shaft in accordance with aspects of the embodiments.
Figure 5:
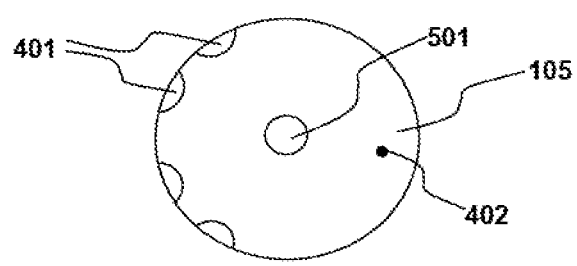
FIG. 5 illustrates a top view of a central shaft in accordance with aspects of the embodiments.

FIG. 4 illustrates a side view of a central shaft 105 in accordance with aspects of the embodiments. The central shaft 105 has detent grooves 401 and an index pin 402. FIG. 5 illustrates a top view of the central shaft 105 of FIG. 4. The central shaft in this embodiment is seen to have four detent grooves 401. Screw 201 can pass through screw hole 501 to fix central shaft 105 to upper section 200. Index pin 402 can stick into an index hole in the upper section 200 to align the central shaft 105 to the upper section 200 such that the detent grooves 401 are properly aligned to indicate the positions of switches in the upper section 200.

Figure 6:
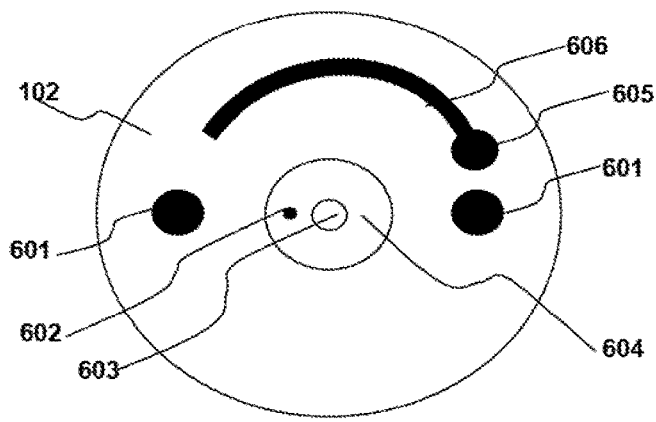
FIG. 6 illustrates a bottom view of an upper section accordance with aspects of the embodiments.

FIG. 6 illustrates a bottom view of an upper section in accordance with aspects of the embodiments. Index hole 602 can be seen within countersunk area 604. Note that the countersunk area 604 can help in central shaft 105 installation. The central shaft 105 can be attached to the upper section 200 by aligning index pin 402 to index hole 602 and fitting the top of the central shaft 105 into countersunk area 604. At this point, screw hole 501 is substantially aligned with threaded hole 603. Screw 201 can then be easily passed though screw hole 501 and threaded into threaded hole 603 to attach central shaft 105 to upper section 200. Additional screws can be passed through holes 601 to attach spacer 102 to knob top 101. Slot 606 is sized such that the shaft of stop 203 can slide along the slot 606, but that the head of stop 203 is too large to slide along slot 606. The head of stop 203 can fit into lockout 605 when the knob is in its lockout position and can fit through lockout 605 when the sliding component 104 is pulled into the lower section to thereby take the knob out of lockout. When the knob is locked out, lower section 103 and sliding component 104 cannot rotate on central shaft 105 because the top of stop 203 cannot enter slot 606.

Figure 7:
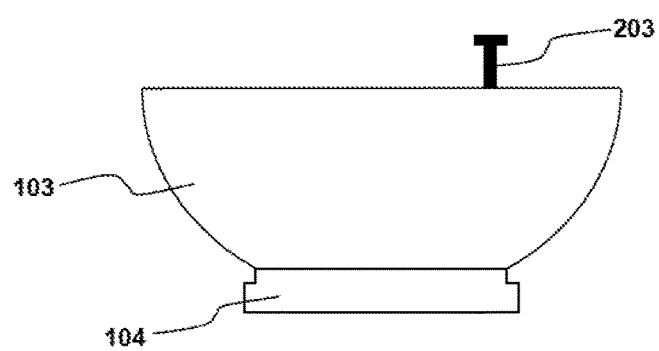
FIG. 7 illustrates a side view of an assembly of a lower section and sliding component in accordance with aspects of the embodiments.

FIG. 7 illustrates a side view of an assembly of a lower section and sliding component in accordance with aspects of the embodiments. Here, the sliding component 104 has been pulled into lower section 103 such that the top of stop 203 is far above the top of lower section 103. In this position, the stop 203 is probably too high to engage lockout 605 and may even be high enough to activate a switch.

Figure 8:
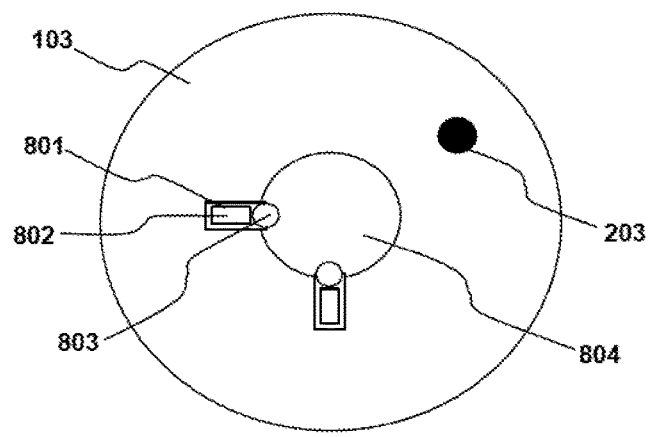
FIG. 8 illustrates a top view of the assembly of FIG. 7 in accordance with aspects of the embodiments.

FIG. 8 illustrates a top view of the assembly of FIG. 7 in accordance with aspects of the embodiments. Two detent engagements 801 can be seen. The illustrated detent engagements 801 have detent springs 802 pressing detent balls 803 against central shaft 105. When aligned, the detent balls press 803 into detent grooves 401, thereby causing the detent engagement 801 to engage the detent groove 401. The tactile feel of a detent engagement 801 engaging a detent groove 401 is quite noticeable as the lower section 103 is pulled into a rotational alignment with the upper section 200.

Figure 9:
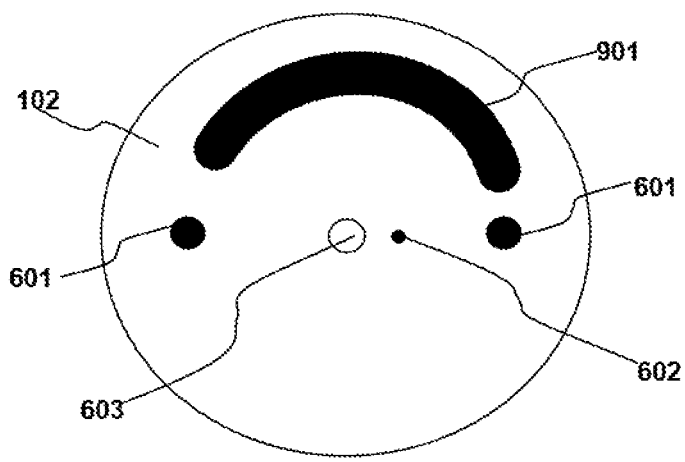
FIG. 9 illustrates a top view of a spacer in accordance with aspects the embodiments.

FIG. 9 illustrates a top view of a spacer 102 in accordance with aspects of the embodiments. Viewed from the top, holes 601 appear smaller in the illustrated embodiment because the holes 601 are countersunk on the other side. Index hole 602 is visible because in this embodiment it is drilled entirely through the spacer 102. Groove 901 is sized such that the top of stop 203 can slide through groove 901 while the shaft of stop 203 slides through slot 606.

Figure 10:
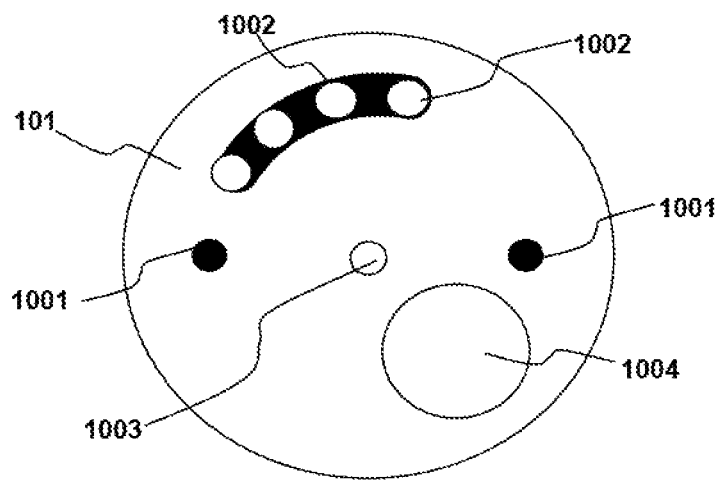
FIG. 10 illustrates a bottom view of a knob top in accordance with aspects of the embodiments.

FIG. 10 illustrates a bottom view of a knob top 101 in accordance with aspects of the embodiments. Screws passed through holes 601 in the spacer and can be threaded into threaded holes 1001 to attach the spacer 102 to the knob top 101. Similarly, central shaft 105 can be attached to the upper section 200 by a screw threaded into hole 1003. Note that, in most embodiments, hole 603 is not threaded if hole 1003 is threaded and that hole 603 is threaded if hole 1003 is not threaded. Four switch contacts 1002 are shown within a groove in the knob top 101 such that the knob 100 incorporates four switches with each switch corresponding to a different rotational alignment of the upper section 200 and lower section 103. In this embodiment, the stop 203 is also a switch contact and touching the stop to one of the switch contacts 1002 closes an electrical circuit. Other embodiments can have complete switch assemblies, such as push button switches, instead of switch contacts 1002. In such embodiments, stop 203 pushes the push button switch to close the switch. A battery 1004 can supply power to the switching circuits and to other electric circuitry within the knob 100.

Figure 11:
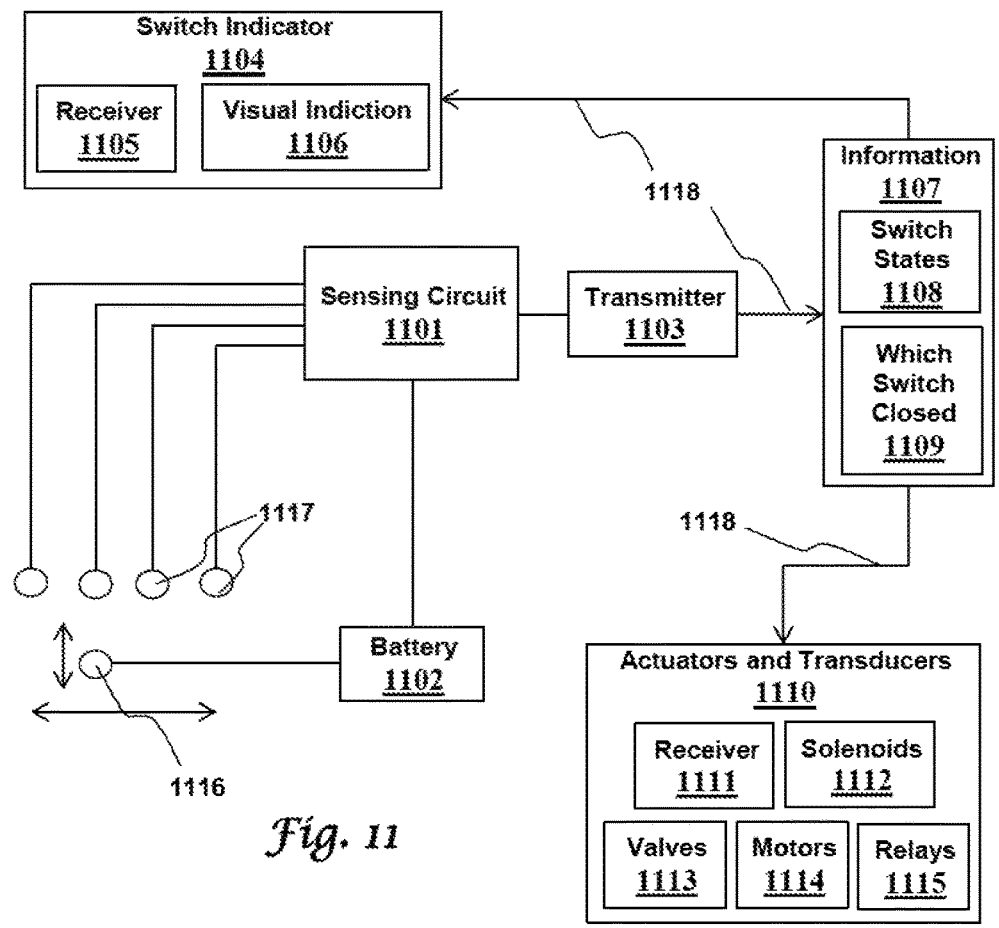
FIG. 11 illustrates electrical circuitry in accordance with aspects of the embodiments.

FIG. 11 illustrates electrical circuitry in accordance with aspects of the embodiments. Similar to the embodiment of FIG. 10, FIG. 11 illustrates four switches where a single moveable contact 1116 can engage any one of four stationary contacts 1117 to thereby close one of the four switches. Those skilled in the art may prefer to refer to the four switches as a four position switch. A battery 1102 or other internal or external power source can energize sensing circuit 1101 when one of the switches is closed such that the sensing circuit 1101 is powered and also such that the sensing circuit 1101 detects which of the four switches closed. Powering sensing circuit 1101 only upon switch closure can conserve power although some embodiments can instead keep the sensing circuit energized. The sensing circuit 1101 can produce information 1107 and pass information 1107 to transmitter 1103 which transmits a signal 1118 containing information 1107. Here, transmitter 1103 is a wireless transmitter although wired connections can instead be used. Information 1107 can include information indicating switch states 1108, indicating which switch closed 1109, or other information. An actuator and transducer controller 1110 having a receiver 1111 can receive the signal 1118 and interpret the information 1107. For example, receiver 1111 can receive switch closed information 1109 and interpret it to produce switch state information. The controller 1110 can then operate one or more solenoids 1112, valves 1113, motors 1114, relays 1115, or some other actuators/transducers based on the information 1107 in the signal 1118.

A switch indicator 1104 that also contains a receiver 1105 can also receive the information 1107 in the signal 1118 and control a visual indication 1106 accordingly, such as four LEDs corresponding to the four switches. For example, the sensing circuit 1101 can interpret a switch closure to toggle one of the switch states 1108. The actuator controller 1110 can interpret the switch states 1108 and accordingly operate one or more actuator or transducer. The switch indicator 1104 can interpret the switch state 1108 and provide an indication of the switch state or provide some other relevant indication. One example is provide four LEDs indicating switch states. Another example is to provide a hexadecimal number or other number indicating switch states. Yet another example is to display text indicating switch state or vehicle state, Vehicle state could be indicated as "4 wheel low" which could correspond to switch state "0010" (switch two closed) to "0110" (switches 2 and 3 toggled on, switches 1 and four toggled off) or to some other variation of information 1107.

Figure 12:
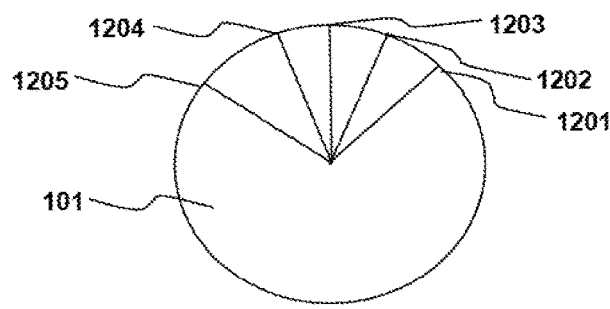
FIG. 12 illustrates switch positions and a lockout position in accordance with aspects of the embodiments.

FIG. 12 illustrates switch positions 1201-1204 and a lockout position 1205 in accordance with aspects of the embodiments. The switch positions 1201-1204 and lockout position 1205 each correspond to one of five rotational alignments of the lower section 103 relative to the upper section 200. As discussed above, proper positioning of detent grooves 401 and detent engagements 801 can provide tactile indications of the rotational alignments and can help keep the upper section 200 and lower section 103 aligned in one of the rotational alignments.

Figure 13:
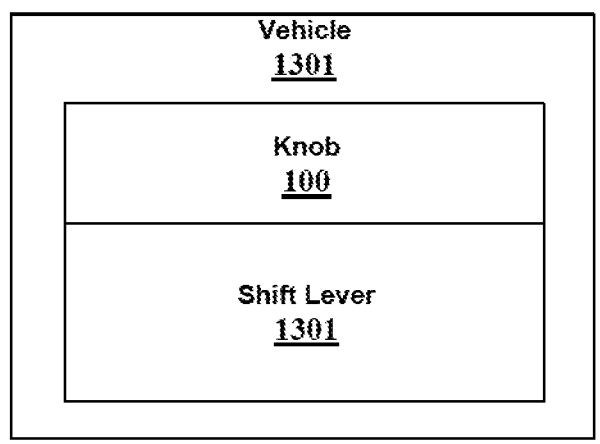
FIG. 13 illustrates a vehicle having a knob attached to a shift lever in accordance with an aspect of the embodiments.

FIG. 13 illustrates a vehicle 1301 having a knob 100 attached to a shift lever 1301 in accordance with an aspect of the embodiments.

Signal 1118 can be a Bluetooth signal or other signal that can be received by a smartphone, tablet computer, or similar device. In such embodiments, the switch indicator can be a smartphone or other device that can receive and interpret Bluetooth signals. Other embodiments can have the actuator and transducer controller 1110 sending and receiving signals such as Bluetooth signals. Such embodiments can have a smartphone or similar device controlling the actuator and transducer controller 1110 or can have the actuator and transducer controller 1110 sending vehicle state information to an indicator such as switch indicator 1104.

It is noted that, as used in this specification and the appended claims, the singular forms "a," "an," and "the" include plural referents unless expressly and unequivocally limited to one referent. As used herein, the term "include" and its grammatical variants are intended to be non-limiting, such that the recitation of items in a list is not to the exclusion of other like items that can be substituted or other items that can be added to the listed items.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system comprising:
a knob comprising an upper section, a lower section, a sliding component, and a central shaft, wherein a hole in the lower section passes completely through the lower section, wherein the central shaft passes through a hole in the sliding component, wherein the sliding component passes into the hole in the lower section, wherein the central shaft is fixedly attached to the upper section, wherein the central shaft extends from the upper section then through and out of the hole in the lower section, wherein the lower section rotates on the central shaft, and wherein the sliding component slides along the central shaft and into the hole in the lower section; and
a plurality of switches aligned with a plurality of switch positions wherein each switch position is one of a plurality of rotational alignments of the lower section with respect to the central shaft, wherein the sliding component is spring loaded to an open position, wherein one of the switches is closed by pulling the sliding component toward the upper section when the lower section is aligned to one of the switch positions.

2. The system of claim 1 wherein the upper section comprises a spacer and a knob top wherein the spacer is fixedly attached to the knob top and wherein the central shaft is fixedly attached to the spacer.

3. The system of claim 1 wherein the central shaft comprises a plurality of detents and wherein the lower section comprises a detent engagement that engages one of the detents when the lower section is aligned to one of the switch positions, wherein the detent engagement engaging one of the detents provides a tactile feedback indicating that the lower section is rotationally aligned to one of the switch positions.

4. The system of claim 1 further comprising a lockout position, wherein the lockout position is one of the rotational alignments, wherein a spring presses the sliding component out of the lower section and locks the lower section in the lockout position when the lower section is rotated to the lockout position.

5. The system of claim 1 wherein the sliding component slides into the lower section and wherein a spring inside the lower section presses the sliding component back out of the lower section, and wherein a stop prevents the sliding component from being pressed completely out of the lower section.

6. The system of claim 5 further comprising an electric switching circuit comprising a first leg that passes from the upper section to the sliding component, a second leg passing through the sliding component, a first contact fixedly attached to the sliding component, and a second contact inside the upper section, wherein pulling the sliding component toward the upper section causes the first contact to touch the second contact, and wherein the stop is the first contact.

7. The system of claim 1 further comprising a sensing circuit that detects when one of the switches is closed and produces a signal indicating that one of the switches has closed and identifying which of the switches has closed.

8. The system of claim 7 wherein the upper section encases the sensing circuit.

9. The system of claim 7 wherein the upper section encapsulates the sensing circuit.

10. The system of claim 7 wherein the lower section encases the sensing circuit.

11. The system of claim 7 further comprising a battery wherein closing one of the switches provides battery power to the sensing circuit.

12. A system comprising:
a knob comprising an upper section, a lower section, a sliding component, and a central shaft, wherein the central shaft passes through a hole in the sliding component, wherein the sliding component passes into a hole in the lower section, wherein the central shaft is fixedly attached to the upper section, wherein the lower section rotates on the central shaft, and wherein the sliding component slides along the central shaft; and a plurality of switches aligned with a plurality of switch positions wherein each switch position is one of a plurality of rotational alignments of the lower section with respect to the central shaft, wherein the sliding component is spring loaded to an open position, wherein one of the switches is closed by pulling the sliding component toward the upper section when the lower section is aligned to one of the switch positions; and an electric switching circuit comprising a first leg that passes from the upper section to the sliding component, a second leg passing through the sliding component, a first contact fixedly attached to the sliding component, and a second contact inside the upper section, wherein pulling the sliding component toward the upper section causes the first contact to touch the second contact, and wherein one of the switches is closed when the first contact touches the second contact.

13. The system of claim 12 further comprising a sensing circuit that detects when one of the switches is closed and produces a signal comprising information wherein the information indicates that one of the switches has closed and identifies which one of the switches has closed.

14. The system of claim 13 further comprising a wireless transmitter that sends a wireless signal to a receiver wherein the wireless signal comprises the information.

15. The system of claim 14 comprising a battery wherein closing one of the switches provides battery power to the sensing circuit and to the wireless transmitter.

16. The system of claim 15 wherein the central shaft is configured to be fixedly attached to a gear shift lever of a vehicle, wherein the gear shift lever is threaded and wherein the central shaft threads onto the gear shift lever.

17. The system of claim 14 further comprising a switch indicator comprising a second receiver, wherein a plurality of switch states is controlled by the switches, wherein the second receiver receives the wireless signal and wherein the indicator provides a visual indication of the switch states.

18. The system of claim 13 further comprising a plurality of switch states and a switch state controller wherein the switch state controller receives the information and changes at least one of the switch states based on information.

19. A method comprising:

selecting a switch by rotating a lower section of a knob to a switch position wherein the switch position is one of a plurality of switch positions, wherein the switch is one of a plurality of switches, wherein the lower section rotates around a central shaft, and wherein an upper section of the knob is fixedly attached to the central shaft;

closing the switch by pulling a sliding component into the knob, wherein the central shaft passes through the sliding component, wherein the sliding component slides along the central shaft and passes into the lower section, and wherein a spring pushes the sliding component away from the upper section and into an open position; and rotating the lower section to a lockout alignment wherein the spring pushes the sliding component into a lockout position when the lower section is in the lockout alignment, and wherein the lower section is prevented from rotating relative to the central shaft when the sliding component is in the lockout position.

* * * * *